United States Patent [19]

Nanoux

[11] 3,936,341
[45] Feb. 3, 1976

[54] ADHESIVE LACQUER, PROCESS FOR ITS USE AND PRODUCTS THEREOF

[75] Inventor: Jean Nanoux, Brussels, Belgium

[73] Assignee: Solvay & Cie, Brussels, Belgium

[22] Filed: Mar. 6, 1974

[21] Appl. No.: 448,763

[30] Foreign Application Priority Data

Mar. 8, 1973 France .............................. 73.08424

[52] U.S. Cl. ............... 156/242; 156/332; 156/333; 260/30.4 R; 427/385; 427/407; 427/421; 428/483

[51] Int. Cl.² ............................................ B29B 1/14

[58] Field of Search ........... 156/333, 309, 242, 328, 156/306, 331, 307, 332, 308, 336; 260/30.4 R; 161/254; 428/483; 427/385, 407, 387, 421

[56] References Cited

UNITED STATES PATENTS

| | | | |
|---|---|---|---|
| 2,078,910 | 4/1937 | Merrill | 156/308 |
| 2,797,179 | 6/1957 | Reynolds et al. | 156/332 |
| 2,953,489 | 9/1960 | Young | 260/30.4 R |
| 3,058,949 | 10/1962 | Coover et al. | 260/30.4 R |
| 3,257,266 | 6/1966 | Sapper | 156/333 |
| 3,450,594 | 6/1969 | Hennessy | 156/306 |
| 3,450,650 | 6/1969 | Murata | 260/30.4 R |
| 3,493,550 | 2/1970 | Schmitt et al. | 260/30.4 R |
| 3,628,991 | 12/1971 | Thiele et al. | 427/407 |
| 3,720,540 | 3/1973 | Wimmer | 428/483 |
| 3,723,172 | 3/1973 | Ismail | 156/306 |
| 3,811,980 | 5/1974 | Rooerhoff | 156/333 |

FOREIGN PATENTS OR APPLICATIONS

| | | | |
|---|---|---|---|
| 1,485,398 | 7/1966 | France | |
| 596,108 | 12/1947 | United Kingdom | 156/333 |
| 907,769 | 10/1962 | United Kingdom | 156/307 |

Primary Examiner—Douglas J. Drummond
Assistant Examiner—J. J. Gallagher
Attorney, Agent, or Firm—Spencer & Kaye

[57] ABSTRACT

An adhesive lacquer is provided which comprises tetrahydrofuran and an acrylate ester polymer containing at least 50 mol% of an acrylate ester. The adhesive lacquer is especially useful in joining a thermoplastic resin to a thermosetting resin. A layer of the adhesive lacquer preferably is first applied on the thermoplastic resin and the thermosetting resin is thereafter applied to the layer of adhesive laquer to effect the joining of the two resins.

15 Claims, 1 Drawing Figure

U.S. Patent   February 3, 1976   3,936,341
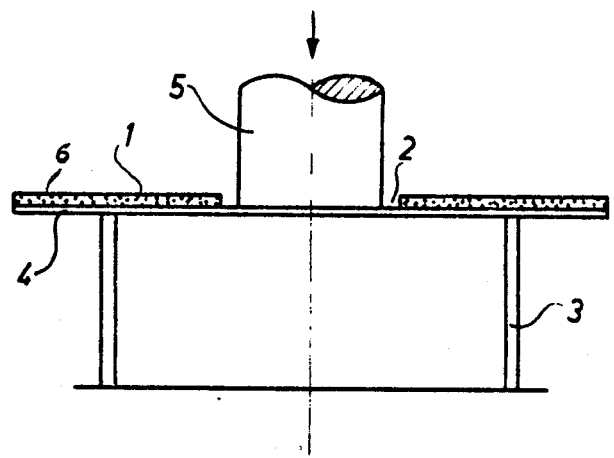

ADHESIVE LACQUER, PROCESS FOR ITS USE AND PRODUCTS THEREOF

BACKGROUND OF THE INVENTION

The present invention relates to a new adhesive lacquer, a process for joining a thermoplastic resin to a thermosetting resin by means of this lacquer as well as the products obtained at the various stages of this process.

It has already been proposed to combine the properties of thermoplastic resins such as, for example, polyvinyl chloride, polystyrene and acrylonitrile-butadiene-styrene resins with those of thermosetting resins such as, for example, polyester resins, by producing structures in which these two types of material are joined by gluing.

However, it has not been possible hitherto to produce this combination satisfactorily because the various methods proposed for producing adhesion do not succeed in imparting sufficient resistance to delamination to this combination.

Thus, for example, it has been proposed, in British Pat. No. 866,776 in the name of ARTRITE RESINS Ltd. of Mar. 12th, 1957 to produce containers made of polyvinyl chloride equipped with an outer layer of reinforced polyester resin containing a crosslinking monomer (acrylate ester) which exerts a dissolving effect on polyvinyl chloride. This process in fact leads to an excellent result when the layer of polyester resin, as is claimed, is placed outside the container. It has been found, however, that if the polyester resin is placed inside the container, the adhesion between the layer of thermosetting resin and the wall of polyvinyl chloride becomes very uncertain.

This defective result can be explained by the fact that, during their crosslinking, polyester resins undergo shrinkage. Consequently, this phenomenon leads to adhesion of a mechanical nature between the two layers of resin when the layer of polyester resin is placed outside the reinforced article while it promotes delamination when, on the other hand, the layer of polyester resin is placed inside the article.

According to German Pat. application No. 1,958,647 in the name of KARLSKRONA-VARVET A. B. of Nov. 22nd, 1969, adhesion of a sheet of plastic such as polyvinyl chloride to a layer of thermosetting resin is achieved by using, as the adhesive, a solution of polymethyl methacrylate in methylene chloride. However, the laminates produced according to this process have insufficient resistance to delamination to enable them to be used in practice.

Accordingly, there has been a continuing search for an adhesive that can join a thermoplastic resin with a thermosetting resin to produce an article that has good resistance to delamination.

SUMMARY OF THE INVENTION

The present invention describes an adhesive lacquer which is particularly suitable for joining a thermoplastic resin to a thermosetting resin and which imparts extremely high resistance to delamination to this combination.

The adhesive lacquer according to the present invention comprises tetrahydrofuran and an acrylate ester polymer containing at least 50 mol% of an acrylate ester.

The lacquer of the present invention preferably can contain a second solvent selected from the group consisting of amide solvents and sulfoxide solvents. Also, the lacquer preferably can contain a diluent selected from the group consisting of chlorinated hydrocarbons, ketones and alkyl esters.

In accordance with the method of the present invention a thermoplastic resin is joined to a thermosetting resin preferably by applying a layer of the above adhesive lacquer to the thermoplastic resin, and thereafter applying the thermosetting resin to the adhesive lacquer layer and curing the thermosetting resin. The adhesive lacquer layer is preferably dried on the thermoplastic resin so that the lacquer layer contains a total of no more than 15% of solvent and diluent.

It is to be understood that both the foregoing general description and the following detailed description are exemplary and explanatory but are not restrictive of the invention.

DESCRIPTION OF THE DRAWING

The sole FIGURE of the attached drawing schematically illustrates a test device for measuring adhesion between two layers.

DETAILED DESCRIPTION OF THE INVENTION

In accordance with the present invention, the adhesive lacquer contains tetrahydrofuran. The tetrahydrofuran acts as a solvent for the acrylate ester polymer and is an essential ingredient of the lacquer compositions because it produces an adhesive that provides markedly better resistance to delamination of thermoplastic resin that is joined to thermosetting resin than other solvents that have been used individually with acrylate ester polymers.

According to a preferred embodiment of the present invention, however, the lacquer can also advantageously contain one or more other solvents chosen from the group formed by amide solvents and sulfoxide solvents.

By way of examples of these amide solvents, there may be mentioned dimethylformamide, methylformamide, diethylformamide, ethylformamide, diemthylacetamide and dimethylpropionamide which are very suitable.

Among the sulfoxide solvents, dimethylsulfoxide and diethylsulfoxide may be mentioned by way of examples. Dimethylformamide is the preferred second solvent for use in the lacquers of the present invention.

It has also been found that it can be advantageous to introduce one or more diluents into the composition of the adhesive lacquer. These diluents can be selected from the group consisting of chlorinated hydrocarbons, ketones and alkyl esters.

Thus, the introduction into the adhesive lacquer of chloroform, methylene chloride, ethyl acetate, amyl acetate, methyl ethyl ketone, diethyl ketone or methyl isobutyl ketone makes it possible, in many cases, to achieve particularly noteworthy resistances to delamination.

The adhesive lacquer preferably contains 5 to 20 % by weight of the acrylate ester polymer. The latter is preferably chosen from among polymers containing at least 50 mol % and still more preferably at least 75 % of an acrylic acid ester derived from an alcohol containing 1 to 4 carbon atoms. The best results are obtained with polymethyl methacrylates.

However, other acrylate ester polymers such as, for example, polymethyl acrylate and copolymers of methyl acrylate and methyl methacrylate have been used successfully in adhesive lacquers according to the present invention.

In copolymers, the comonomer may advantageously be selected among vinyl chloride, vinyl acetate styrene, substituted derivatives of styrene and acrylic or methacrylic acid esters derived from alcohols containing from 1 to 4 atoms of carbon different from those constituting the main component of the copolymer.

The best results are however obtained when the acrylate or methacrylate ester polymer is a homopolymer.

It has also been observed that the resistance to delamination achieved with the adhesive lacquer according to the invention is the better, the higher is the molecular weight of the acrylate ester polymer. Thus, with a polymethyl methacrylate of molecular weight of the order of 50,000, noteworthy results are already achieved, but by working under the same conditions with the polymethyl methacrylate of molecular weight of the order of 300,000, the results are further improved.

In practice, a polymethyl methacrylate of molecular weight higher than 20,000 and preferably higher than 100,000 can be used. It has also been found that it can be very advantageous to add to the adhesive lacquer 2 to 15% by weight of a vinyl chloride polymer which is preferably a copolymer of vinyl chloride and vinyl acetate.

Thus, the incorporation into the adhesive lacquer of 2 to 15% by weight of a copolymer of vinyl chloride and vinyl acetate containing up to 15 mol % of vinyl acetate makes it possible to obtain products which have a noteworthy impact strength when a thermoplastic resin is joined to a thermosetting resin.

The quantity of tetrahydrofuran present in the composition of the adhesive lacquer can vary between 5 and 95% by weight of the lacquer. It depends especially on the number of constituents used to produce the latter.

Thus, it is quite obvious that the quantity of tetrahydrofuran can vary between 80 and 95% by weight of the lacquer when the latter consists solely of this solvent and of the acrylate ester polymer.

On the other hand, when one or more other solvents as defined above are used in addition, the quantity by weight of tetrahydrofuran varies between 10 and 65%, and preferably between 20 and 55%, while the quantity be weight of the other solvent or solvents varies between 20 and 85%, and preferably between 30 and 75%.

The best results are achieved when tetrahydrofuran, one or more other solvents and one or more diluents as defined above are used in conjunction.

In the latter case, the proportions by weight of the various constituents of the adhesive lacquer can vary between 5 and 20%, and preferably between 10 and 15%, in the case of tetrahydrofuran, and between 15 and 45%, and preferably between 20 and 40%, in the case of the other solvent or solvents, while the quantity by weight of diluent(s) can be as much as 60%.

As has been stated, the adhesive lacquer according to the present invention is very particularly suitable for joining a thermoplastic resin to a thermosetting resin, by gluing.

In this use, the preferential procedure consists of applying a layer of the adhesive lacquer according to the invention to the surface of the thermoplastic resin to be glued, then applying the thermosetting resin to the layer of adhesive lacquer and effecting the curing of the thermosetting resin.

The term "thermoplastic resin" as used in the specification and claims means any resin, the shape of which can be altered during successive reheatings at least to its softening point and which retains the successive shapes which are imparted to it after cooling to below its softening point.

The thermoplastic resins preferentially used are vinyl polymers containing at least 50 mol % of vinyl chloride, polystyrene and polymers based on acrylonitrile, butadiene and styrene. Vinyl chloride polymers are very particularly suitable.

Before applying the layer of adhesive lacquer to the thermoplastic resin, it is often useful to subject the latter to a degreasing treatment, for example, by washing with a chlorinated hydrocarbon which dissolves greases.

The adhesive lacquer is applied to the surface of the thermoplastic resin to be glued at the rate of 100 to 300 $g/m^2$. Any known technique whatsoever such as, for example, spraying, roller coating, knife coating, brush coating or transfer coating and the like, can be used for this application.

After having carried out this coating, it is desirable, in order to achieve the best results, to leave the adhesive layer deposited to dry in such a way that, at the time of applying the thermosetting resin, the lacquer film applied contains less than 15% by weight of solvent and diluent. This result can especially be achieved by prolonged drying in air. However, this drying can be activated, when this is necessary for productivity reasons, by heating the thermoplastic resin at a temperature below its melting point for a sufficient period of time. This heating can, for example, be carried out by leaving the product in an oven or by passing it through a furnace.

In order to facilitate the deposition of the film of adhesive lacquer, it is preferable for the thermoplastic resin to be in the form of a flat structure such as, for example, a film, a sheet or a plate.

It has been further found that it is possible to subject the thermoplasitc resin coated with dried adhesive lacquer to a treatment which has the effect of changing its shape.

Thus, for example, it is possible to subject the flat films, sheets and plates of thermoplastic resin coated with the lacquer to a vacuum shaping treatment without in any way altering the subsequent adhesive power of the lacquer deposited.

When this shape changing treatment is a vacuum heat-shaping, the heating of the thermoplastic resin coated with adhesive lacquer plays a part in drying this lacquer.

The term "thermosetting resin" as used in the specification and claims means any resin which can, under the effect of heat, undergo a chemical change which manifests itself by an increase in hardness and the appearance of infusibility and insolubility in practically all solvents.

Among these thermosetting resins, it is preferred to use unsaturated polyester resins containing a crosslinking monomer.

The latter resins can be prepared especially by esterification of saturated dibasic acids such as, for example, phthalic, adipic, succinic and sebacic acids with an unsaturated alcohol such as, for example, an allyl alcohol, or by esterification of a saturated polyhydric alcohol such as, for example, ethylene glycol, diethylene glycol, trimethylene glycol, 1,2-propylene glycol or glycerol with an unsaturated polycarboxylic acid or an anhydride derived from these acids, such as, for example, maleic, fumaric, itaconic and citraconic acids or anhydrides. However, any unsaturated polyesters can of course be used.

As has been stated, the unsaturated polyester resin also contains a crosslinking monomer such as, for example, diallyl phthalate or styrene.

The unsaturated polyester resin can also contain a source of free radicals which promotes the crosslinking reaction such as, for example, an organic peroxide and a catalyst such as cobalt naphthenate or cobalt octoate. This source can be chosen so that it initiates the crosslinking reaction at the desired moment, for example by giving preference to a catalyst which becomes active only above a temperature markedly higher than ambient temperature.

It is also possible to use peroxides which are active at ambient temperatures by making use of known techniques which consist of combining the various ingredients which initiate the crosslinking only at the time of their use.

The thermosetting resin can be applied to the film of adhesive lacquer by any known technique such as, for example, spraying or brush coating. Moreover, these resins can be reinforced, for example, with glass fibers.

When the layer of thermosetting resin is applied by simultaneously spraying glass fibers and crosslinkable polyester resin, it is advantageous also to use glass micro-spheres which act as a filler, facilitate the subsequent operation of removing bubbles and reduce shrinkage during crosslinking.

According to another technique, the layer of thermosetting resin can advantageously consist of a nonwoven or a woven fabric of glass fibers impregnated with crosslinkable unsaturated polyester resin, known commercially by the trade name of "prepreg".

After applying the layer of thermosetting resin, the crosslinking reaction is initated, for example, by heating the combination to a sufficiently high temperature. Of course, this crosslinking is initated automatically when the free radical sources and catalysts used are active at ambient temperature.

The thermoplastic resins coated with adhesive lacquer according to the present invention can, after drying, be stored for a long period of time without the lacquer film losing its adhesive properties.

Because of this, it is possible to prepare flat or shaped articles made of thermoplastic material coated with a film of dried adhesive lacquer according to the invention, and then to transport the latter thereafter to a factory which specializes in processing thermosetting resins, even if the factory is a very long way away.

This possibility thus makes it feasible to carry out the first part of the operations — coating with lacquer and optionally shaping — in a factory suitable for processing thermoplastic materials, and then to transfer the half-finished product, optionally after storage, to a factory which specializes in processing thermosetting resins.

By working in accordance with the process described, shaped finished articles have been produced, including articles such as boat hulls, door-frame components, panels, roofing components and the like, consisting of a layer of thermoplastic material and of a layer of thermosetting resin, which are characterized by great rigidity and by amazing adhesion between the constitutent layers.

The adhesive lacquer according to the invention and the process for its use are further explained in more detail by the practical embodiments which now follow and which are given purely by way of illustration and not by way of limitation.

TEST FOR MEASURING ADHESION

As no method for measuring adhesion exists in the literature which can be transposed directly for measuring the adhesion between the layers of the product produced by the present invention, a special method for measuring this adhesion was developed which is described below with reference to the only FIGURE of the attached drawing.

A square sample 1 of side length 100 mm is cut out of a product containing a thermoplastic resin 4, bound by an adhesive to a thermosetting resin 6, with the cutting taking place after complete crosslinking of the thermosetting resin. Then the portion of the layer of thermosetting resin 6, such as polyester resin, situated at the center of the sample is removed by milling in such a way as to lay bare the layer of thermoplastic resin 4, taking care not to damage this layer. The milling of thermosetting resin 6 is performed in such a way as to produce in the thermosetting resin 6 a circular hollow 2 having a diameter of 30 mm. The sample 1 is then centered over the aperture of a metal pipe 3 of external diameter 70 mm and internal diameter 66 mm, the metal pipe being in a vertical position, by laying the layer of thermoplastic resin 4 over the aperture of the said pipe. The part of sample 1 which has been laid bare of the thermosetting layer is then subjected to the action of a circular piston 5 of diameter 25 mm of a tensometer, for example of the INSTRON type, the rate of downward movement of which is 5 mm/minute. The force/deformation diagram of this experiment is drawn up and the force corresponding to the appearance of a maximum on the curve obtained is noted. It will be agreed that this maximum corresponds to the force necessary to cause delamination between the layers of resin at the periphery of the hollow.

In the examples which now follow, it should be noted further that Examples 1 to 3, which are given by way of comparison, are not part of the scope of the invention since the lacquers used are free from tetrahydrofuran.

EXAMPLES 1 to 18

Lacquers are produced, the composition by weight of which is given in Table 1 below, by gradually introducing polymethyl methacrylate resin in powder form or a mixture of this resin with a copolymer of vinyl chloride and vinyl acetate into the other constituent or constituents of the lacquer which are stirred constantly.

The polymethacrylate resin used is a resin of molecular weight of the order of 300,000 sold by ROHM and HAAS under the trade name PLEXIGUM M 920. The copolymer of vinyl chloride and vinyl acetate used is a resin containing 11.8 mol % of vinyl acetate sold by SOLVIC S.A. under the trade name SOLVIC 523 KC.

A layer of this lacquer is then applied at the rate of 200 g/m$^2$ to a sheet of polyvinyl chloride of thickness 1.5 mm, produced by extrusion, the surface of which is free from grease. The polyvinyl chloride used is a product obtained by suspension polymerization, with a K- number of between 64 and 68 (measured in 1,2-dichloroethane) and sold by SOLVIC S.A. under the trade name SOLVIC 239. The formulation extruded is stabilized by means of a lead salt and is free from plasticizer. The application of the lacquer is carried out by means of a roller dipping into the lacquer.

After having applied the lacquer, the coated sheet of polyvinyl chloride is dried in air for 3 minutes and then in an oven at 100°C for 3 minutes.

The dried sheet is then vacuum-formed after heating to 130°C by means of an infra-red ray generator.

After the sheet has been released from the mold and cooled, a layer of polyester resin reinforced with glass fibers of thickness 2.5 mm is applied to the coated face of the thermoshaped sheet.

For this purpose, a spray gun with two nozzles is used, each nozzle being connected to a feed pot. A mixture of 70 parts by weight unsaturated polyester derived from maleic acid, phthalic acid and propylene glycol sold by UNION CHIMIQUE BELGE under the trade name UCEFLEX R66SL, 30 parts by weight styrene, and 2.5 parts by weight methyl ethyl ketone peroxide is introduced into the first pot.

An identical composition, except that the 2.5 parts of methyl ethyl ketone peroxide are replaced by 1 part of cobalt octoate, is introduced into the second pot.

Simultaneously, glass fibers of length 3 cm are sprayed in a proportion such that they form 30% by weight of the coating applied.

After removing bubbles from the applied layer, the coated sheet is introduced into an oven kept at 50°C for a dwell time of 1 hour so as to bring about the cross-linking of the polyester. Finally, after cooling, a square and flat test piece of side length 100 mm is cut out of the article produced and is subjected to the test described above after it has been stored for 24 hours at 20°C.

The values of the force necessary to cause delamination of each sample as a function of the composition of the adhesive lacquer used are given in Table 1. A study of Table 1 shows that the use of a lacquer containing only tetrahydrofuran, as in Example 4, gives a markedly better result than the other solvents methylene chloride, methyl ethyl ketone, and dimethylformamide used individually in Examples 1, 2 and 3, respectively. Table 1 also shows that the use of a lacquer containing tetrahydrofuran, an amide solvent or a sulfoxide solvent and one or more diluents makes it possible to achieve remarkable delamination forces. The table further shows that the use of a small proportion of a copolymer of vinyl chloride and vinyl acetate leads to products which have a very satisfactory impact strength. Thus the products of Examples 6, 7, 9, 10, 12, 13 and 14 which contain a copolymer of vinyl chloride and vinyl acetate are very resistant to the impact of boxwood balls of diameter 30 mm thrown against the sheet of polyvinyl chloride at a speed of 35 m/second, while the products produced in the reference examples 1, 2 and 3 are not resistant thereto.

TABLE 1

| No. of examples | A | B | C | D | E | F | G | H | I | J | K | L | Notes |
|---|---|---|---|---|---|---|---|---|---|---|---|---|---|
| 1 | 14.5 | — | — | — | — | — | — | 85.5 | — | — | — | 70 | |
| 2 | 14.5 | — | — | — | 85.5 | — | — | — | — | — | — | — | poor adhesion to polyvinyl chloride |
| 3 | 14.5 | — | — | 85.5 | — | — | — | — | — | — | — | — | production of a gel which cannot be applied to polyvinyl chloride |
| 4 | 14.5 | — | 85.5 | — | — | — | — | — | — | — | — | 160 | |
| 5 | 14.5 | — | 42.75 | 42.75 | — | — | — | — | — | — | — | 180 | |
| 6 | 9 | 5.5 | 42.75 | 42.75 | — | — | — | — | — | — | — | 185 | remarkable impact strength |
| 7 | 14.5 | 10 | 35 | — | — | 40.5 | — | — | — | — | — | 200 | remarkable impact strength |
| 8 | 14.5 | — | 30.5 | 55 | — | — | — | — | — | — | — | 200 | |
| 9 | 12 | 6 | 12 | 25 | 30 | 15 | — | — | — | — | — | 400* | remarkable impact strength |
| 10 | 10.5 | 5.5 | 12 | 26 | 31 | 15 | — | — | — | — | — | 400* | remarkable impact strength |
| 11 | 14 | — | 16 | 21 | — | — | 38 | 11 | — | — | — | 200 | |
| 12 | 10.5 | 3.5 | 16 | 21 | — | — | 38 | 11 | — | — | — | 200 | remarkable impact strength |
| 13 | 9 | 5.5 | 14.5 | 35.5 | 35.5 | — | — | — | — | — | — | 400* | remarkable impact strength |
| 14 | 9 | 5.5 | 14.5 | 35.5 | — | — | — | 35.5 | — | — | — | 400* | remarkable impact strength |
| 15 | 18 | — | 12 | 25 | 30 | 15 | — | — | — | — | — | 300 | |
| 16 | 14.5 | — | 10.5 | — | 25 | — | 25 | 25 | — | — | — | 275 | |
| 17 | 14.5 | — | 10.5 | — | 25 | — | — | 25 | — | 25 | — | 300 | |

TABLE 1-continued

| No. of examples | A | B | C | D | Composition of the lacquer E | F | G | H | I | J | K | L | Notes |
|---|---|---|---|---|---|---|---|---|---|---|---|---|---|
| 18 | 14.5 | — | 10.5 | — | 25 | — | — | 25 | — | — | 25 | 170 | |

*In these tests, it is found that delamination is due to rupture of the layer of polyvinyl chloride and not to true detachment of the latter
A — polymethyl methacrylate % by weight
B — Copolymer of vinyl chloride and vinyl acetate % by weight
C — Tetrahydrofuran % by weight
D — Dimethylformamide % by weight
E — Methyl ethyl ketone % by weight
F — Ethyl acetate % by weight
G — Chloroform % by weight
H — Methylene chloride % by weight
I — Diethylformamide % by weight
J — Dimethylacetamide % by weight
K — Dimethylsulfoxide % by weight
L — Delamination force according to the method given, kg
M — Dimethylsulfoxide % by weight It will be understood that the above description of the present invention is susceptible to various modifications, changes and adaptations, and the same are intended to be comprehended within the meaning and range of equivalents of the appended claims.

I claim:

1. A process for joining a thermoplastic resin to a thermosetting resin, comprising applying a layer of an adhesive lacquer to the surface of the thermoplastic resin, said lacquer comprising tetrahydrofuran as a solvent and an acrylate ester polymer containing at least 50 mol % of an acrylate ester, and thereafter applying the thermosetting resin in uncured form to the layer of adhesive lacquer and curing the thermosetting resin.

2. The process according to claim 1, wherein the thermoplastic resin is chosen from the group comprising vinyl polymers containing at least 50 mol % of vinyl chloride, polystyrene, and polymers based on acrylonitrile, butadiene and styrene.

3. Process according to claim 2, wherein the thermoplastic resin is a vinyl chloride polymer.

4. Process according to claim 1, wherein the surface of the thermoplastic resin is cleaned with a chlorinated hydrocarbon before applying the adhesive lacquer.

5. The process according to claim 1, wherein the adhesive lacquer is applied to the thermoplastic resin at the rate of 100 to 300 g/m$^2$.

6. The process according to claim 1, wherein after having applied the layer of adhesive lacquer to the surface of the thermoplastic resin, the lacquer is dried until it does not contain more than 15% by weight of solvent, and the thermosetting resin is applied to the dry lacquer.

7. The process according to claim 6 wherein the lacquer contains a second solvent selected from the group consisting of amide solvents and sulfoxide solvents.

8. The process according to claim 6 wherein the lacquer contains a diluent selected from the group consisting of chlorinated hydrocarbons, ketones and alkyl esters, and the lacquer is dried on the thermoplastic resin until it does not contain more than 15% by weight of solvent and diluent, and the thermosetting resin is applied to the dry lacquer.

9. The process according to claim 6 wherein the thermoplastic resin layer is heated to dry the lacquer.

10. The process according to claim 1, wherein the thermoplastic resin coated with adhesive lacquer is shaped before applying the thermosetting resin.

11. The process according to claim 10 wherein the shaping of the thermoplastic resin is effected by vacuum forming.

12. The process according to claim 1, wherein the thermosetting resin is a polyester resin.

13. The process according to claim 12 wherein the polyester resin is reinforced.

14. The process according to claim 13, wherein the polyester resin is reinforced with glass fibers.

15. A process for joining a thermoplastic resin to a thermosetting resin by applying an adhesive lacquer to one of the two resins comprising using as the adhesive lacquer a composition comprising tetrahydrofuran and an acrylate ester polymer containing at least 50 mol % of an acrylate ester.

* * * * *